(12) United States Patent
Chin

(10) Patent No.: US 11,226,521 B2
(45) Date of Patent: Jan. 18, 2022

(54) LIQUID CRYSTAL DIMMING FILM

(71) Applicant: ELITE OPTOELECTRONIC CO., LTD., New Taipei (TW)

(72) Inventor: Chia-Chien Chin, New Taipei (TW)

(73) Assignee: ELITE OPTOELECTRONIC CO., LTD., New Taipei (TW)

( * ) Notice: Subject to any disclaimer, the term of this patent is extended or adjusted under 35 U.S.C. 154(b) by 77 days.

(21) Appl. No.: 16/553,851

(22) Filed: Aug. 28, 2019

(65) Prior Publication Data

US 2021/0063796 A1    Mar. 4, 2021

(51) Int. Cl.
*G02F 1/1343* (2006.01)
*G02F 1/1333* (2006.01)
*G02F 1/1334* (2006.01)

(52) U.S. Cl.
CPC ........ *G02F 1/13439* (2013.01); *G02F 1/1334* (2013.01); *G02F 1/133305* (2013.01); *C09K 2323/00* (2020.08); *C09K 2323/03* (2020.08); *C09K 2323/05* (2020.08); *C09K 2323/06* (2020.08)

(58) Field of Classification Search
CPC ........... G02F 1/13439; G02F 1/133305; G02F 1/1334; C09K 2323/00; C09K 2323/06; C09K 2323/05; C09K 2323/03
See application file for complete search history.

(56) References Cited

U.S. PATENT DOCUMENTS

| 9,118,018 B2* | 8/2015 | Tsai | H01L 51/0021 |
| 2011/0108191 A1* | 5/2011 | Sanai | C08G 18/672 156/275.5 |
| 2015/0284595 A1* | 10/2015 | Yoo | B32B 37/12 428/167 |
| 2017/0152702 A1* | 6/2017 | Chang | G02F 1/13439 |

* cited by examiner

*Primary Examiner* — Anthony J Frost
(74) *Attorney, Agent, or Firm* — Muncy, Geissler, Olds & Lowe, P.C.

(57) ABSTRACT

A liquid crystal dimming film includes two substrates, two conductive layers, two free radical resisting layers and a liquid crystal layer. After the two conductive layers are electrically conducted, the electric field generated by the conductive layer can change the liquid crystal light transmission state of the liquid crystal layer. In addition, the free radical resisting layers are coated and photo-cured on both surfaces of the liquid crystal layer respectively. When the two liquid crystal layers are situated in a lighting environment, the free radical resisting layer can capture the free radicals produced by the liquid crystal layer to prevent the free radicals from affecting the conductive layer, thereby maintaining good photoelectric properties of the conductive layer.

10 Claims, 4 Drawing Sheets

LIQUID CRYSTAL DIMMING FILM

BACKGROUND OF INVENTION

(1) Field of the Invention

The present disclosure relates to a liquid crystal dimming film, more particularly to the liquid crystal dimming film having a free radical resisting layer on both surfaces of a liquid crystal layer, and the free radical resisting layer is capable of capturing free radicals produced by the liquid crystal layer in a lighting environment to prevent 7C bonds in the middle of the PEDOT:PSS of a conductive layer from being damaged by the free radicals.

(2) Brief Description of Related Art

As the liquid crystal (LC) technology advances, liquid crystals can be used in the technical area of dimming films in addition to the area of display devices, and the dimming film using liquid crystals is primarily composed of a transparent electrode, a transparent substrate and a liquid crystal, and the manufactured dimming film can alter the orientation of the liquid crystals by changing the electric field applied to the liquid crystals, so as to change the amount of transmitted light by blocking or passing an external light. This dimming film technology is used extensively in the areas of construction and automobiles. In the applications for construction, a piece of glass with the dimming film can block excessive light from entering into a room. In the applications for automobiles, the dimming film can block the light to give a thermal insulation effect. With reference to FIG. 1 for a conventional liquid crystal dimming film 10, the conventional liquid crystal dimming film 10 is comprised of a liquid crystal layer 101, two conductive layers 102 and two substrates 103, wherein both sides of the liquid crystal layer 101 have two conductive layers 102 formed thereon respectively, and the other sides of the two conductive layers 102 have two substrates 103 formed thereon respectively, so that the two substrates 103 can clamp the liquid crystal layer 101 and the two conductive layers 102 by an adhesion or fixing process. In the adhesion procedure, an adhesive containing a photo-curing agent is coated between the liquid crystal layer 101 and the two conductive layers 102, and an ultraviolet light is projected onto the adhesive, so that the two conductive layers 102 can be adhered and fixed to the liquid crystal layer 101. In FIG. 2, when the dimming film is situated in a lighting environment, the photo-curing agent in the liquid crystal layer 101 will produce free radicals, and the free radicals will be transferred to the two conductive layers 102 to damage the n bond in the middle of poly(3, 4-ethylenedioxythiophene) of the conductive layer 102, so as to reduce the electrical conductivity of the conductive layer 102 and affect the photoelectric property of the liquid crystal layer 101 in the polymer dispersed liquid crystal. As a result, the light transmittance of the liquid crystal layer 101 is reduced, and the deflection cannot be achieved easily under the action of electric field. Therefore, preventing the conductive layer from being interfered by free radicals and the photoelectric property of the liquid crystal layer from being affected is a problem still remains to be solved.

SUMMARY OF INVENTION

Therefore, it is a primary objective of the present disclosure to provide a liquid crystal dimming film capable of preventing a conductive layer from being damaged by free radicals.

According to the present disclosure, a liquid crystal dimming film includes two substrates, two conductive layers, two free radical resisting layers and a liquid crystal layer. After the two conductive layers are electrically conducted, the electric field generated by the conductive layer can change the liquid crystal light transmission state of the liquid crystal layer. In addition, the free radical resisting layers are coated and photo-cured on both surfaces of the liquid crystal layer respectively. When the two liquid crystal layers are situated in a lighting environment, the free radical resisting layer can capture the free radicals produced by the liquid crystal layer to prevent the free radicals from affecting the conductive layer, thereby maintaining good photoelectric properties of the conductive layer.

According to the present disclosure,
(1) the substrate is transparent, and the substrate is disposed on the outermost layer of the liquid crystal dimming film, and the substrate has flexibility according to material properties;
(2) the conductive layer contains (poly(3,4-ethylenedioxythiophene):poly(4-styrenesulfonate), PEDOT:PSS), a graphite structure, and silicon oxide, and the conductive layer is transparent;
(3) the free radical resisting layer is formed by mixing a transparent resin, a hindered amine light stabilizer (HALS) and an ultraviolet absorber (UV Absorber);
(4) The liquid crystal layer is a polymer dispersed liquid crystal (PDLC).

The manufacturing procedure of the liquid crystal dimming film in accordance with the present disclosure comprises the steps of: coating a conductive layer 203 onto one of the surfaces of two substrates 204 and then carrying out a heat curing process; coating a free radical resisting layer 202 onto the other surface of the conductive layer 203, and then carrying out the heat curing process again; putting the liquid crystal layer 201 between two free radical resisting layers 202; coating a photo-curing agent onto the liquid crystal layer 201 and the two free radical resisting layers 202, and finally carrying out a light curing process of the liquid crystal layer 201 to create the liquid crystal dimming film.

In summation, the liquid crystal dimming film captures the free radicals by the free radical resisting layer, so that the free radicals produced by the photo-curing agent in the liquid crystal layer can be isolated from the free radical resisting layer to prevent the conductive layer from being damaged by the free radicals, and also prevent the electrical conductivity of the conductive layer from being affected, so as to maintain a good light transmittance of the liquid crystal layer and a good deflection efficiency of the liquid crystal.

DETAILED DESCRIPTION OF PREFERRED EMBODIMENTS

To make it easier for our examiner to understand the objective of the present disclosure, its features, and advantages, we use a preferred embodiment together with the attached drawings for the detailed description of the disclosure.

Figure 1:
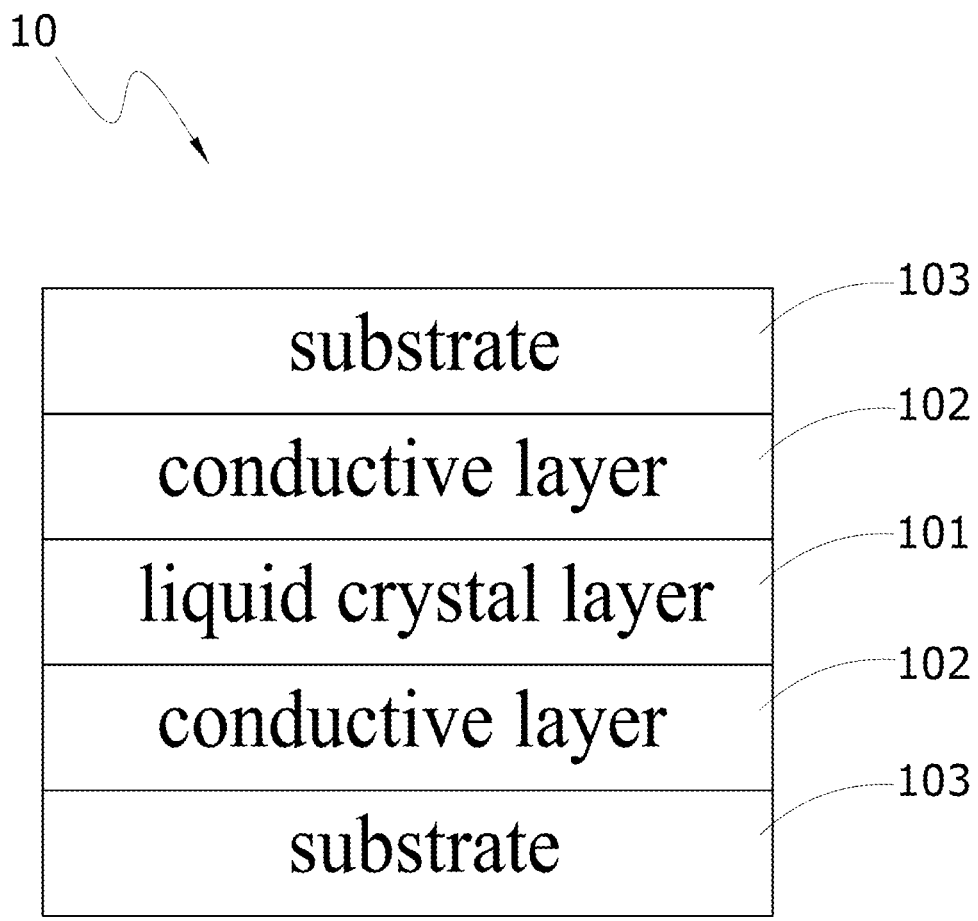
FIG. 1 is a structural diagram of a conventional liquid crystal dimming film.
Figure 2:
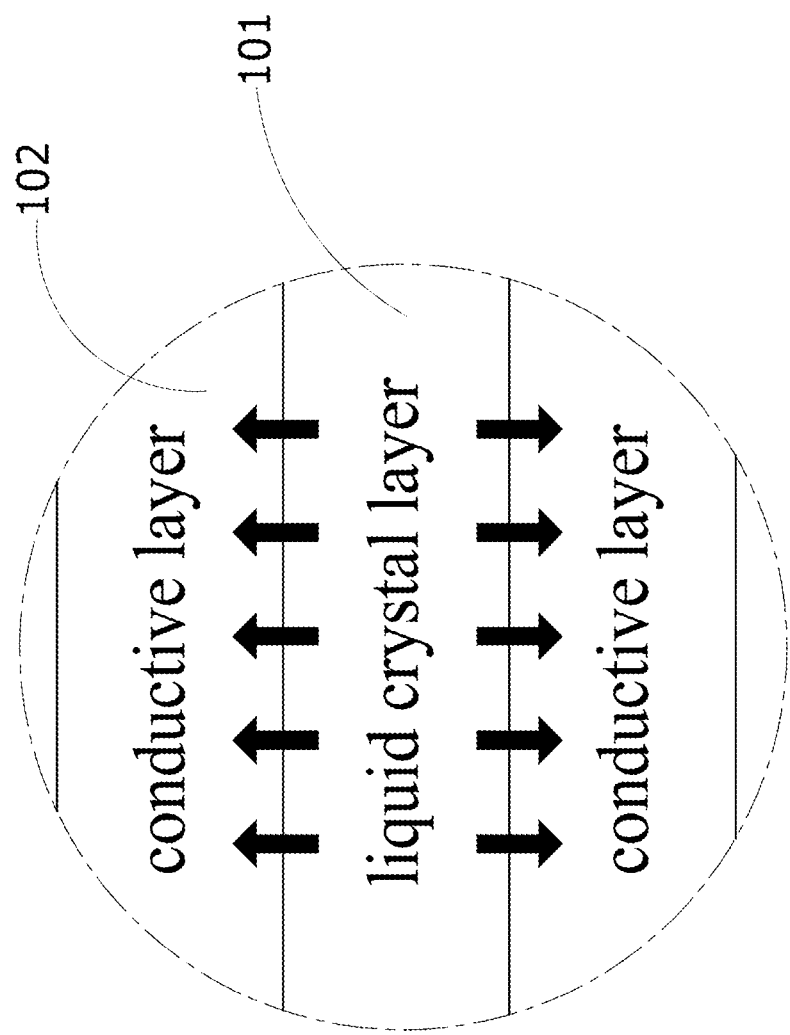
FIG. 2 is a schematic view of an embodiment of a conventional liquid crystal dimming film.
Figure 3:
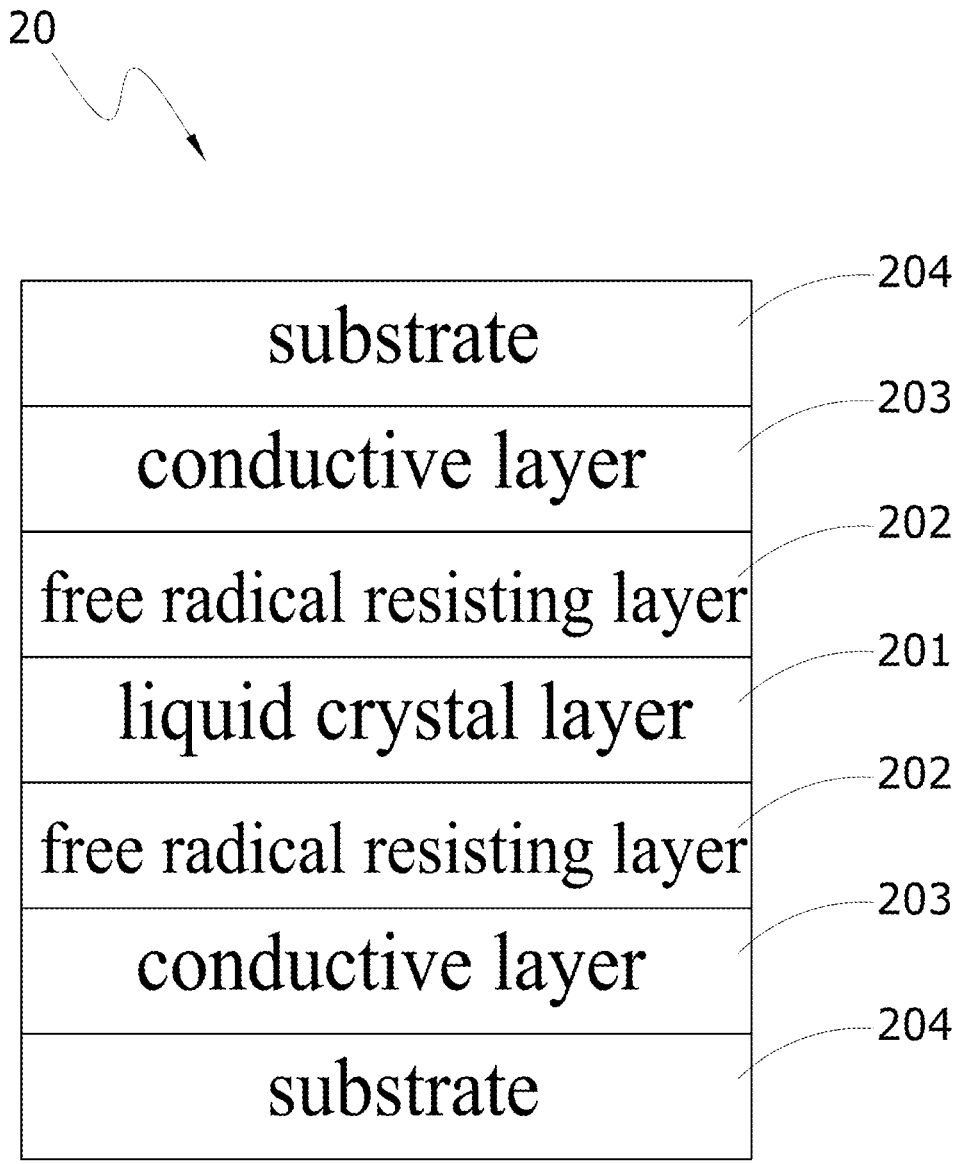
FIG. 3 is a structural diagram of a liquid crystal dimming film of the present disclosure.

With reference to FIG. 3 for a liquid crystal dimming film 20 of the present disclosure, the liquid crystal dimming film 20 comprises a liquid crystal layer 201, two free radical resisting layers 202, two conductive layers 203 and two substrates 204, wherein both surface of the liquid crystal layer 201 have a free radical resisting layer 202, and the other sides of the two free radical resisting layers 202 have a conductive layer 203, and the other sides of the two conductive layers 203 have a substrate 204 formed thereon, wherein the assembled structure of the liquid crystal dimming film 20 is shown in FIG. 3 and the details are described below.

(1) The liquid crystal layer 201 is a polymer dispersed liquid crystal (PDLC). Since the polymer dispersed liquid crystal in the phase of polymer resin can act as an adhesive, therefore the polymer dispersed liquid crystal with excellent adhesiveness and impact resistance has the advantage of good flexibility.

(2) The free radical resisting layer 202 is disposed on both surfaces of the liquid crystal layer 201, and the free radical resisting layer 202 is formed by mixing a transparent resin, a hindered amine light stabilizer (HALS) and an ultraviolet absorber (UV Absorber), and the transparent resin has a percentage by weight equal to 90%-99% of the overall composition, and the mixture of the hindered amine light stabilizer and the ultraviolet absorber has a percentage by weight not greater than 10% of the overall composition, and the transparent resin is one selected from the group consisting of aqueous polyurethane, solvent-based polyurethane, cationic acrylic resin, polyimide (PI), and polycarbonate (PC), and the hindered amine light stabilizer (HALS) is generally used in the plastic industry to improve the weather resistance of plastic products, reduce the free radicals produced by light excitation or metal ions, and maintain the stability of oxides in a system. In the present disclosure, the hindered amine light stabilizer (HALS) is added into a polymer material to capture the free radicals in the polymer material and decompose the oxide, and minimize the damage of the polymer material caused by the free radicals, and the HALS is preferably bis(2,2,6,6-tetramethyl-4-piperidyl) sebacate, poly((6-((1,1,3,3-tetramethylbutyl)amino)-s-triazine-2,4-diyl)-((2,2,6,6-tetramethyl-4-piperidyl)imino)-hexamethylene-((2,2,6,6-tetramethyl-4-piperidyl)imino)), or poly(4-hydroxy-2,2,6,6-tetramethyl-1-piperidine ethanol-alt-1,4-butanedioic acid). The ultraviolet absorber is capable of converting light energy into heat energy and preventing plastic materials to have a photo-oxidation reaction, so as to provide a light stabilization effect. The ultraviolet absorber can be divided according to the molecular structure into salicylate, benzophenone, benzotriazole, substituted acrylonitrile, diphenyl acetonide and triazine organic substance, and the ultraviolet absorber (UVA) is preferably 2-hydroxy-4-n-octoxybenzophenone or 2-(2-hydroxy-5-methylphenyl) benzotriazole, and the ultraviolet absorber is capable of absorbing the energy of light with a wavelength of 290-400 nm, and the thickness of the free radical resisting layer 202 is preferably not greater than 10 um;

(3) The conductive layer 203 is disposed on the other side of the free radical resisting layer 202, wherein the conductive layer 203 is composed of a transparent conductive polymer, and the transparent conductive polymer contains (poly(3,4-ethylenedioxythiophene):poly(4-styrenesulfonate), PEDOT:PSS)), a graphite structure, and silicon oxide, and is manufactured by using appropriate percentages by weight of ingredients, wherein the poly(3,4-ethylenedioxythiophene) occupies approximately 30%-70% (percentage by weight) of the conductive material, and the graphite structure occupies approximately 15%-35% (percentage by weight) of the conductive material, and the percentage by weight of the graphite structure preferably falls within a range of 20%-25%), and the graphite structure may be graphene, and the percentage by weight of the silicon oxide preferably falls within a range of 15%-35% and most preferably falls within a range of 20%-25%, and the silicon oxide is nano silicon mainly manufactured by nanotechnology, and the structure of the nano silicon is very small and has a water-forming mesh structure attached onto the surface of poly 3,4-ethylenedioxythiophene to strengthen the overall structure of the conductive layer 203, and the nano silicon has an UV resisting property, so that the overall anti-photodegradable property, chemical resistance and stability of the conductive layer 203 can be improved effectively.

(4) The substrate 204 is transparent and may be made of a substance selected from the group consisting of polyethylene terephthalate (PET), polyethylene (PE), poly nitrile (PN), polyimide (PI), polyamide (PA), polyurethane (PU), and a combination of the above. The substrate 204 may be in any shape such as a rectangular, circular or square shape and it may come with any size. The property of the material of the substrate 204 gives the substrate 204 a flexible property.

The manufacturing method of the conductive layer 203 in accordance with the present disclosure comprises the steps of:

(1) adding poly 3,4-ethylenedioxythiophene with a percentage by weight equal to 30%~70% of the overall composition;

(2) adding an additive to increase the electrical conductivity, and further adding an ether-based compound (such as tetrahydrofuran), or a compound containing amide or lactam groups (such as caprolactam, N-methylcaprolactam, N,N-dimethylmethylacetamide, N-methylacetamide, N,N-dimethylformamide (DMF), N-methylformamide, N-methylformanilide, N-methylpyrrolidone (NMP), N-octylpyrrolidone, pyrrolidone), sulfone and sulfoxide, (such as sulfolane (tetrameythylene sulfone), dimethyl sulfoxide (DMSO)), sugar alcohol (such as sorbitol, and mannitol), glycol or polyol (such as ethylene glycol, glycerin, diethylene glycol and triethylene glycol), tetrahydrofuran, N-methylformamide, N-methylpyrrolidone, ethylene glycol, dimethyl sulfoxide or sorbitol as to improve the electrical conductivity of the conductive layer 203.

(3) adding water or other protic solvents such as isopropanol and butanol, and a mixture of water and these alcohols, wherein water is a better solvent;

(4) adding a silicon oxide solution with a percentage by weight equal to 30%~70% of the overall composition, and the silicon oxide is mainly nano silicon formed by a nano process, and the structure of the nano silicon is very small. An interface activating agent is added to form the conductive layer 203.

The manufacturing procedure of the liquid crystal dimming film 20 in accordance with the present disclosure comprises the steps of:

(1) coating a conductive layer 203 onto one of the surfaces of two substrates 204 and then carrying out a heat curing process;

(2) coating a free radical resisting layer 202 onto the other surface of the conductive layer 203, and then carrying out the heat curing process again;

(3) putting the liquid crystal layer 201 between two free radical resisting layers 202, wherein the free radical resisting layer 202 is formed by mixing a transparent resin, a hindered amine light stabilizer and an ultraviolet absorber, and coating a photo-curing agent onto the liquid crystal layer 201 and the two free radical resisting layers 202, and finally carrying out a light curing process of the liquid crystal layer 201 to create the liquid crystal dimming film 20.

Figure 4:
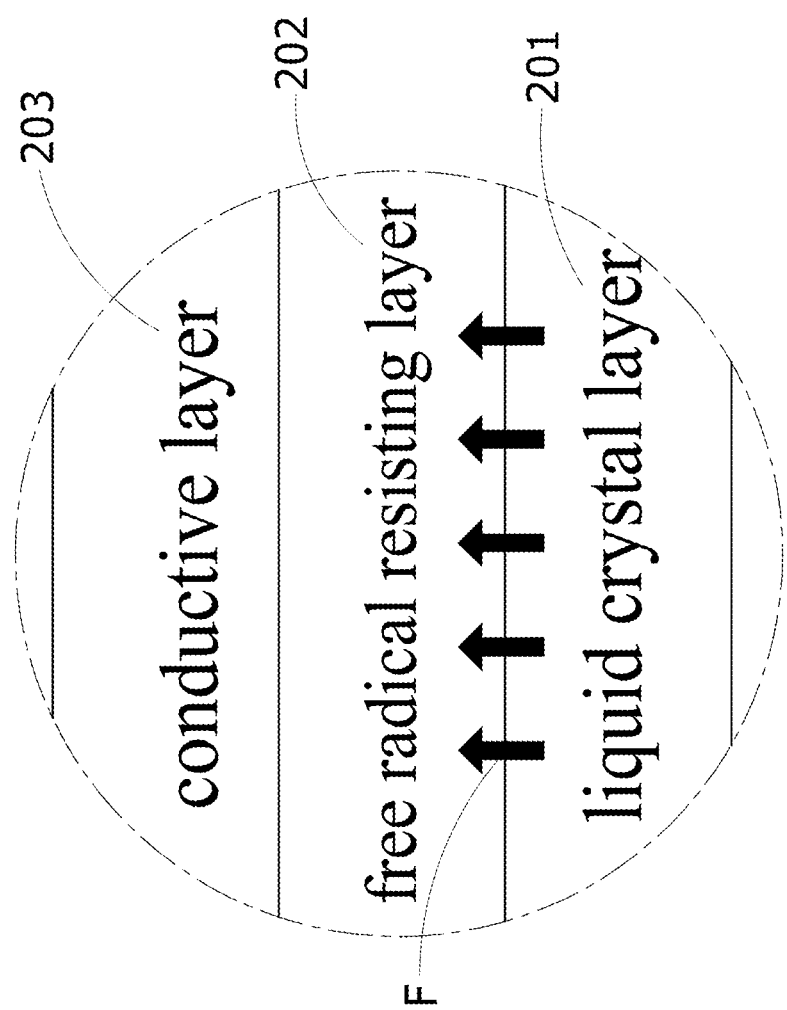
FIG. 4 is a schematic view of an embodiment of the present disclosure.

With reference to FIG. 4 for a liquid crystal dimming film 20 of the present disclosure, the liquid crystal dimming film 20 is placed in a lighting environment, and a photo-curing agent in the liquid crystal layer 201 will be affected by the illumination of the ultraviolet light to produce free radicals F. When the free radicals F move to the free radical resisting layer 202, the free radical resisting layer 202 will capture the free radicals F and jump to a stable state after capturing the free radicals F, so that the free radicals F do not interfere the conductive layer 203, and the effect of maintaining a good electrical conductivity of the conductive layer 203 can be achieved.

When the liquid crystal dimming film of the present disclosure is applied in the area of construction, the liquid crystal dimming film may be attached onto a glass curtain or a glass partition, and the light transmission conditions (including the transparent and opaque conditions) of the liquid crystal dimming film can be changed by controlling the power supply of the conductive layer, so that the glass curtain or glass partition can block external light. In addition, when the ultraviolet light of the sunlight is projected onto the liquid crystal dimming film, the free radical resisting layer of the liquid crystal dimming film can absorb the ultraviolet light, and prevent the free radicals from affecting the conductive layer, so as to maintain a good photoelectric property of the conductive layer.

In summation, the liquid crystal dimming film of the present disclosure comprises two substrates, two conductive layers, two free radical resisting layers and a liquid crystal layer, wherein the liquid crystal dimming film captures the free radicals by the free radical resisting layer, so that the free radicals produced by the photo-curing agent in the liquid crystal layer can be isolated from the free radical resisting layer to prevent the conductive layer from being damaged by the free radicals, and also prevent the electrical conductivity of the conductive layer from being affected, so as to maintain a good light transmittance of the liquid crystal layer and a good deflection efficiency of the liquid crystal. The present disclosure provides a liquid crystal dimming film capable of preventing the conductive layer from being affected by the free radicals.

While the present disclosure has been described by preferred embodiments in conjunction with accompanying drawings, it should be understood that the embodiments and the drawings are merely for descriptive and illustrative purpose, not intended for restriction of the scope of the present disclosure. Equivalent variations and modifications performed by person skilled in the art without departing from the spirit and scope of the present disclosure should be considered to be still within the scope of the present disclosure.

What is claimed is:

1. A liquid crystal dimming film, comprising:
   a liquid crystal layer;
   two flexible substrates;
   two conductive layers, coated on one side of the two substrates respectively, and formed on the two substrates after a curing process, and each conductive layer being made by mixing poly 3,4-ethylenedioxythiophene, nano silicon and a graphite structure, wherein the poly 3,4-ethylenedioxythiophene occupies 30%~70% of a conductive material of the conductive layer, the nano silicon occupies 15%~35% of the conductive material of the conductive layer, and the graphite structure occupies 15%~35% of the conductive material of the conductive layer; and
   two free radical resisting layers, made of a mixture containing a transparent resin and a hindered amine light stabilizer, and the two free radical resisting layers being coated between the liquid crystal layer and the two conductive layers, and after a photo-curing process of the liquid crystal layer, the two free radical resisting layers and the liquid crystal layer are fixed,
   wherein the two free radical resisting layers are configured to capture free radicals produced by a photo-curing agent coated onto the liquid crystal layer and the two free radical resisting layers so as to prevent the two conductive layers from being damaged by the free radicals, and also prevent an electrical conductivity of the two conductive layers from being affected.

2. The liquid crystal dimming film according to claim 1, wherein the substrates are transparent, and are selected from the group consisting of polyethylene terephthalate (PET), polyethylene (PE), poly nitrile (PN), polyimide (PI), polyamide (PA), and polyurethane (PU).

3. The liquid crystal dimming film according to claim 1, wherein the liquid crystal layer is made of a polymer dispersed liquid crystal (PDLC).

4. The liquid crystal dimming film according to claim 1, wherein the free radical resisting layer has a thickness not greater than 10 um.

5. The liquid crystal dimming film according to claim 1, wherein the free radical resisting layer contains a mixture of a transparent resin, a hindered amine light stabilizer and an ultraviolet absorber.

6. The liquid crystal dimming film according to claim 5, wherein the free radical resisting layer is a mixture of the transparent resin, the hindered amine light stabilizer and the ultraviolet absorber, and the transparent resin has a percentage by weight equal to 95~99% of the overall composition, and the mixture of the hindered amine light stabilizer and the ultraviolet absorber has a percentage by weight not greater than 10% of the overall composition.

7. The liquid crystal dimming film according to claim 5, wherein the ultraviolet absorber is one selected from the group consisting of salicylate, benzophenone, benzotriazole, substituted acrylonitrile, diphenyl acetonide, and triazine organic substance.

8. The liquid crystal dimming film according to claim 1, wherein a percentage by weight of the nano silicon ranges from 20% to 25%.

9. The liquid crystal dimming film according to claim 1, wherein the graphite structure is Graphene.

10. The liquid crystal dimming film according to claim 1, wherein the conductive layer is further added with tetrahydrofuran.

* * * * *